(12) United States Patent
Chien

(10) Patent No.: US 11,082,664 B2
(45) Date of Patent: *Aug. 3, 2021

(54) MULTIPLE FUNCTIONS LED NIGHT LIGHT

(76) Inventor: Tseng-Lu Chien, Shi-Chi Town (TW)

( * ) Notice: Subject to any disclaimer, the term of this patent is extended or adjusted under 35 U.S.C. 154(b) by 12 days.

This patent is subject to a terminal disclaimer.

(21) Appl. No.: 11/806,285

(22) Filed: May 31, 2007

(65) Prior Publication Data

US 2007/0242485 A1   Oct. 18, 2007

(51) Int. Cl.
*F21S 8/00* (2006.01)
*F21S 9/02* (2006.01)
(Continued)

(52) U.S. Cl.
CPC ............... *H04N 7/181* (2013.01); *F21K 9/66* (2016.08); *F21S 4/28* (2016.01); *F21S 8/035* (2013.01); *F21S 8/038* (2013.01); *F21S 9/022* (2013.01); *F21S 10/002* (2013.01); *F21V 5/008* (2013.01); *F21V 14/02* (2013.01); *F21V 21/08* (2013.01); *F21V 21/14* (2013.01); *F21V 23/04* (2013.01); *F21V 29/00* (2013.01); *F21V 33/0052* (2013.01); *G01S 3/7864* (2013.01); *H04N 5/2252* (2013.01); *H04N 5/23241* (2013.01);
(Continued)

(58) Field of Classification Search
CPC ............. F21Y 2101/02; F21Y 2103/00; F21Y 2113/00; F21Y 2113/02; F21Y 2113/10; F21Y 2113/13; F21Y 2113/17; F21Y 2101/00; F21V 23/04; F21V 23/06; F21V 19/0005; F21V 19/0025; F21V 19/006; F21V 19/0065; F21V 23/0442; F21V 23/0457; F21V 25/00; F21V 25/02; F21V 25/04; F21V 2200/15; F21S 8/02; F21S 8/035; F21S 8/038; F21W 2121/00; F21K 9/00; F21K 9/235; F21K 9/237; F21K 9/238; F21K 9/60; F21K 9/61; F21K 9/62; F21K 9/66
USPC ............... 362/641, 640, 644, 147, 228, 240; 315/185 S, 292, 295, 312, 318, 360; 340/691.6, 321, 816.45, 310.18
See application file for complete search history.

(56) References Cited

U.S. PATENT DOCUMENTS 2,480,393 A * 8/1949 Bossert ................... H04M 1/22
  362/23.06
3,974,495 A * 8/1976 Jones ....................... 340/309.16
(Continued)

FOREIGN PATENT DOCUMENTS

EP    1435482 A1 *  7/2004  ............... F21V 1/10

*Primary Examiner* — Alan B Cariaso
(74) *Attorney, Agent, or Firm* — Bacon & Thomas, PLLC

(57) ABSTRACT

A multiple function LED night light has at least one LED device and added function(s) such as an air-freshener adaptor device, sonic device, frequency device, sensor device, bug repeller device, second light device, timepiece, electric message device, timer device, temperature device, surge protection device, electric short circuit protection device, base device for installation on an existing lamp socket, emergency light device, or any other electric device(s) suitable for home use to keep people comfortable or safe. The LED device has a first optic means to change the narrow-viewing angle of an LED's spot-light beams into a wider-viewing angle and second optic means to help make the LED night light exhibit a smooth lighting effect. The device may be arranged to fit into an existing night light bulb socket to turn any existing bulb night light into a power saving LED night light.

8 Claims, 3 Drawing Sheets

(51) Int. Cl.

| | | |
|---|---|---|
| *F21V 23/04* | (2006.01) | |
| *F21K 9/66* | (2016.01) | |
| *F21V 5/00* | (2018.01) | |
| *F21V 9/08* | (2018.01) | |
| *H04N 7/18* | (2006.01) | |
| *F21S 10/00* | (2006.01) | |
| *F21V 14/02* | (2006.01) | |
| *F21V 21/08* | (2006.01) | |
| *F21V 21/14* | (2006.01) | |
| *F21V 29/00* | (2015.01) | |
| *F21S 4/28* | (2016.01) | |
| *G01S 3/786* | (2006.01) | |
| *H04N 5/225* | (2006.01) | |
| *H04N 5/232* | (2006.01) | |
| *F21V 33/00* | (2006.01) | |
| *F21V 21/22* | (2006.01) | |
| *F21V 21/29* | (2006.01) | |
| *F21V 21/30* | (2006.01) | |
| *F21W 121/00* | (2006.01) | |
| *F21Y 115/15* | (2016.01) | |
| *F21V 19/00* | (2006.01) | |
| *F21S 2/00* | (2016.01) | |
| *F21Y 115/10* | (2016.01) | |
| *F21K 9/235* | (2016.01) | |

(52) U.S. Cl.
CPC ............. *F21K 9/235* (2016.08); *F21S 2/005* (2013.01); *F21V 9/08* (2013.01); *F21V 19/006* (2013.01); *F21V 19/0025* (2013.01); *F21V 21/22* (2013.01); *F21V 21/29* (2013.01); *F21V 21/30* (2013.01); *F21V 23/0442* (2013.01); *F21V 23/0492* (2013.01); *F21W 2121/00* (2013.01); *F21Y 2115/10* (2016.08); *F21Y 2115/15* (2016.08); *Y02B 10/30* (2013.01); *Y10S 362/80* (2013.01)

(56) References Cited

U.S. PATENT DOCUMENTS

| | | | | |
|---|---|---|---|---|
| 4,701,038 A * | 10/1987 | Neefe | B29D 11/00317 | 351/159.24 |
| 4,729,069 A * | 3/1988 | Von Kohorn | G02B 6/0001 | 362/563 |
| 4,816,973 A * | 3/1989 | Atalla | F21S 8/035 | 362/101 |
| 5,517,264 A * | 5/1996 | Sutton | F21S 8/035 | 353/119 |
| 5,924,784 A * | 7/1999 | Chliwnyj et al. | 362/234 | |
| 6,132,057 A * | 10/2000 | Williams | E05B 17/10 | 362/100 |
| 6,220,722 B1 * | 4/2001 | Begemann | 362/231 | |
| 6,431,719 B1 * | 8/2002 | Lau | F21V 23/0442 | 362/95 |
| 6,478,440 B1 * | 11/2002 | Jaworski | A01M 1/04 | 362/253 |
| 6,499,853 B2 * | 12/2002 | Stekelenburg | F21S 8/035 | 362/231 |
| 6,499,860 B2 * | 12/2002 | Begemann | 362/230 | |
| 6,577,073 B2 * | 6/2003 | Shimizu et al. | 315/246 | |
| 6,648,496 B1 * | 11/2003 | Elghoroury | F21S 8/035 | 362/555 |
| 6,676,274 B1 * | 1/2004 | Rafferty | F21S 8/035 | 362/276 |
| 6,709,126 B1 * | 3/2004 | Leen | F21S 8/035 | 315/159 |
| 6,762,562 B2 * | 7/2004 | Leong | H05B 33/0809 | 315/51 |
| 6,762,563 B2 * | 7/2004 | St-Germain et al. | 315/129 | |
| 6,905,231 B2 * | 6/2005 | Dickie | F21S 8/035 | 362/271 |
| 6,911,915 B2 * | 6/2005 | Wu et al. | 340/815.45 | |
| 6,926,426 B2 * | 8/2005 | Currie | F21S 8/035 | 362/147 |
| 6,953,264 B2 * | 10/2005 | Ter-Hovhannisian | 362/241 | |
| 6,964,498 B2 * | 11/2005 | Wu | F21S 8/035 | 362/231 |
| 6,965,205 B2 * | 11/2005 | Piepgras | H05B 33/0857 | 315/292 |
| 7,025,473 B2 * | 4/2006 | Dokoupil | F21S 8/035 | 362/640 |
| 7,045,975 B2 * | 5/2006 | Evans | F21S 8/035 | 315/149 |
| 7,145,179 B2 * | 12/2006 | Petroski | 257/81 | |
| 7,438,446 B1 * | 10/2008 | McCann | F21S 8/035 | 362/341 |
| 7,524,089 B2 * | 4/2009 | Park | 362/294 | |
| 7,566,142 B2 * | 7/2009 | Wesson | H05B 45/20 | 362/231 |
| 7,632,004 B2 * | 12/2009 | Chien | H04N 5/2256 | 362/641 |
| 7,932,482 B2 * | 4/2011 | Norwood | A01M 1/2077 | 219/494 |
| 10,487,999 B2 * | 11/2019 | Chien | F21V 5/04 | |
| 2002/0159258 A1 * | 10/2002 | Beeman | F21S 8/035 | 362/231 |
| 2003/0185020 A1 * | 10/2003 | Stekelenburg | 362/555 | |
| 2004/0105279 A1 * | 6/2004 | Liu | F21V 3/02 | 362/555 |
| 2004/0142601 A1 * | 7/2004 | Luu | H01R 25/006 | 439/652 |
| 2004/0246704 A1 * | 12/2004 | Burdick | H01R 13/465 | 362/95 |
| 2005/0117343 A1 * | 6/2005 | Leifer | F21S 8/035 | 362/276 |
| 2005/0185402 A1 * | 8/2005 | Hsu | F21S 10/005 | 362/257 |
| 2006/0007709 A1 * | 1/2006 | Yuen | F21S 8/035 | 362/641 |
| 2006/0062019 A1 * | 3/2006 | Young | A47G 33/06 | 362/641 |
| 2006/0146527 A1 * | 7/2006 | VanderSchuit | 362/228 | |
| 2006/0209569 A1 * | 9/2006 | Yuen | F21S 8/035 | 362/641 |
| 2006/0221594 A1 * | 10/2006 | Thuot Rann | A61L 9/037 | 362/96 |
| 2007/0230175 A1 * | 10/2007 | Montgomery | F21S 8/035 | 362/249.16 |
| 2008/0068822 A1 * | 3/2008 | Spartano | F21S 8/035 | 362/95 |
| 2008/0074873 A1 * | 3/2008 | Lin | F21V 5/04 | 362/235 |

* cited by examiner

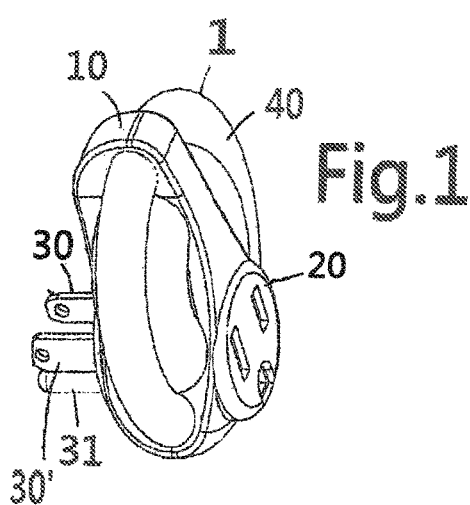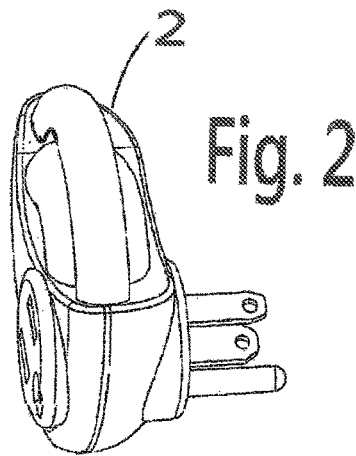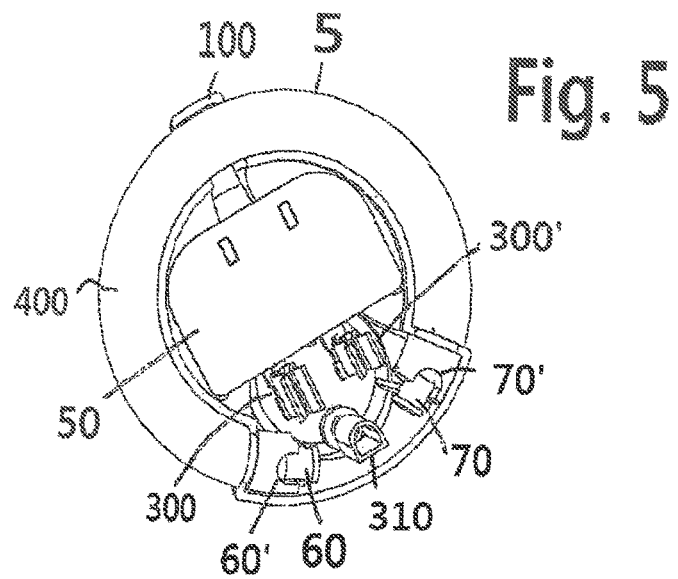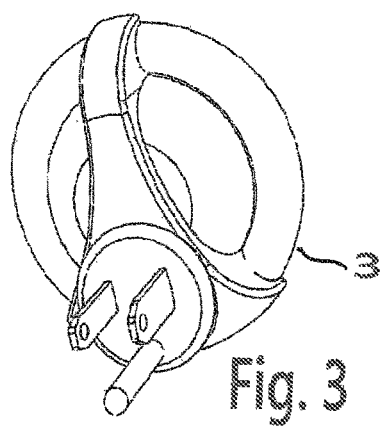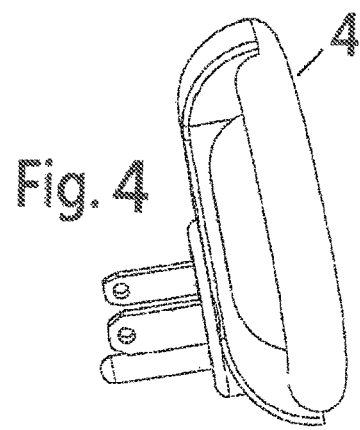

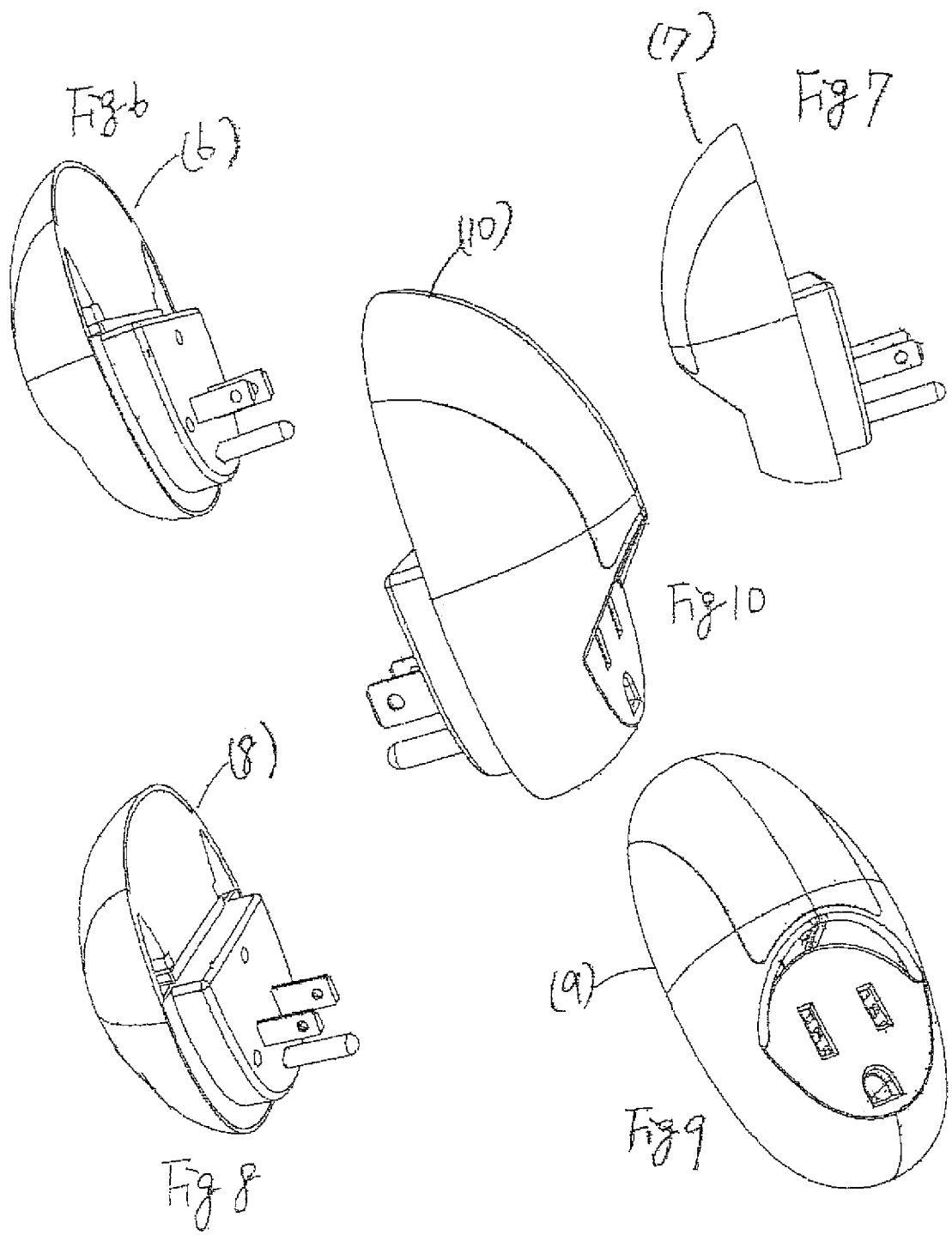

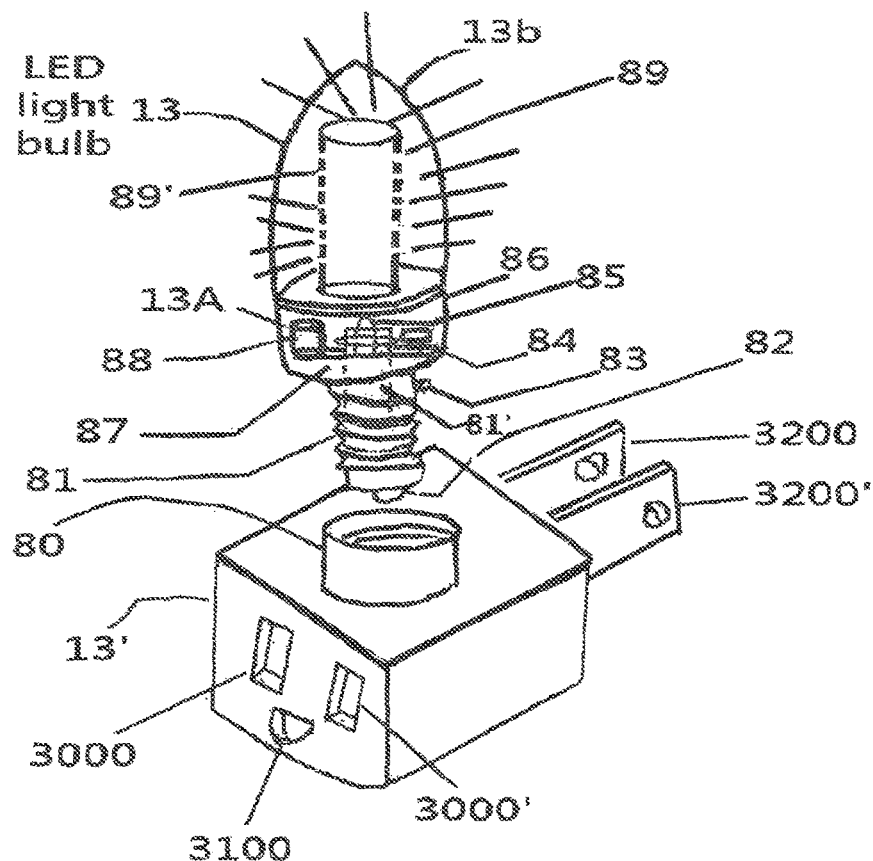
Fig. 13
Different with Prior-Art 6,227,679 5/8-2001
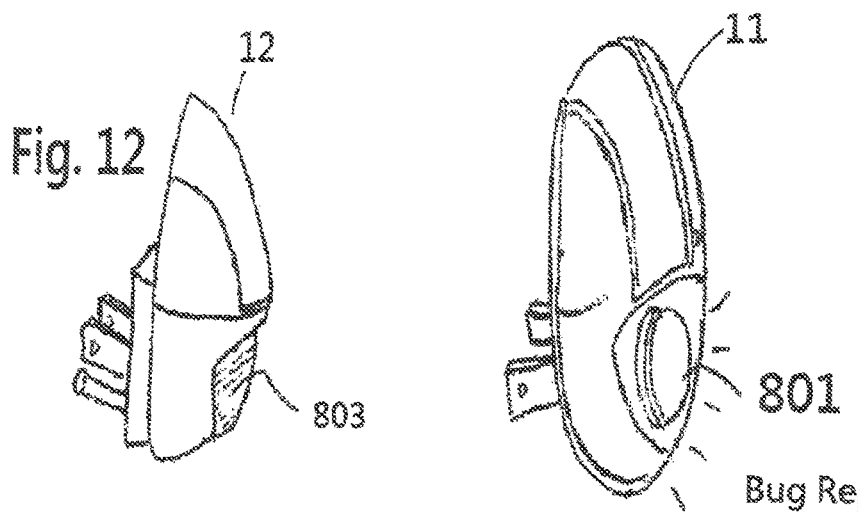
Fig. 12
Fig. 11
Bug Repellor Device or 2nd function Device

MULTIPLE FUNCTIONS LED NIGHT LIGHT

BACKGROUND AND SUMMARY OF THE INVENTION

The following copending U.S. patent applications by the same Inventor also are directed to night lights: Ser. No. 10/883,747, filed Jul. 6, 2004; Ser. No. 11/092,741; Ser. No. 11/094,215; Ser. No. 11/255,981; Ser. No. 11/498,881; Ser. No. 11/527,631; Ser. No. 11/498,874; Ser. No. 11/527,629; and Ser. No. 11/527,628.

In addition, the Inventor's U.S. Pat. Nos. 5,926,440; 6,158,868; 6,170,958; 6,171,117; 6,280,053 disclose arrangements of conductive for night lights and multiple function night lights incorporated time pieces. Other U.S. Pat. Nos. 4,947,291; 5,495,402; 5,662,408; 5,713,655; 5,803,579; 5,816,682; 5,833,350; 5,893,626; 5,998,928; 6,000,807; 6,010,228; 6,031,958; 6,033,087; 6,056,420; 6,132,072; 6,160,948; 6,161,910; 6,183,101; 6,190,017; 6,290,368; 6,337,946; 6,386,730; 6,390,647; 6,00,104; 6,411,524; 6,431,719; 6,509,832; 6,523,976; 6,550,949; 6,609,812; 6,623,416; 6,641,289; 6,648,496; and 6,709,126 all show different light sources and applications but none teaches an LED night light having multiple functions which may be selected from the group including an adaptor device, fan device, heat device, bug repeller device, sonic device, frequency device, or any other home electric appliance or device suitable for adding onto an LED night light.

The current invention offers a big improvement in power saving because it incorporates the low power consumption Light Emitting Diode (LED) to replace the incandescent bulb which normally uses a 4 Watt or 7 Watt or more power consumption light. A single LED normally has a 0.3 Watt+/−100% power consumption depending on the product design and illumination needed.

The current invention not only provides a power saving device but also reduces a consumer's monthly electricity expense. The current invention also supplies two or more additional practical functions to the consumer, which may selected from, for example, an air-freshener and/or (as described in copending U.S. patent application Ser. Nos. 11/527,631; 11/527,629; 11/498,881; 11/498,874; and Ser. No. 11/527,628; etc.) an adaptor device, sonic device, frequency device, bug repeller device, second light device, timepiece, electric message device, timer device, temperature device, surge protection device, electric short circuit protection device, base device for installation on an existing lamp socket, emergency light device, or any other electric device(s) used in a home to keep people comfortable or safe.

This current invention optionally may further incorporate the teachings of the copending application entitled "LED night light with more than one optics" concerning the inclusion in the LED night light of an optical element that improves the visibility of light beams from the LED.

All existing LED nightlights have the big problem that the LED unit can be seen by a viewer over a narrow viewing angle only, and that the brightness over that angle is too strong, resulting in spot-light effects (super bright in a small area). The copending application teaches multiple (more than one) optics to provide a big improvement from spot-light to linear or area brightness, thereby causing the spot-light effects to change to a nice looking lighting effect such as that provided by a fluorescent tube. It is very difficult to use only one piece of optics to cause the strong spot-light LED unit(s) to have nice and warm light effects that can be seen by a viewer. This is a big improvement in the LED night light.

The current invention further adds some other arrangement such as reflector(s), bubble(s), or lens(es) within any of the optics to increase the effects of modifying the narrow viewing angle light beams emitted out of the LED(s) to provide linear or area light effects.

Furthermore, the current LED night light invention solves several problems with the most popular night light in the market place. The most popular night light length is around 88 mm+/−50 mm (with base), The lens height is around 60 mm+/−30 mm (without base). The height from the wall outlet cover is around 35 mm+/−15 mm (from outlet cover surface). If the LED unit is placed on the same location as the outlet cover surface, the distance from the wall to the outside of the lens will be less than 35 mm+/−15 mm, which is too short to make the spot-light LED's into a surface or area photometric or lighted area. The problem is solved by using two optics to get a good surface or area lighting effect. In addition, the LED night light power consumption will fall within the 0.3 W+/−100% per LED range, whereas the power consumption of a bulb night light falls within 4 Watt+/−50% per bulb. So the LED night light will have a big power saving and reduce the monthly electric bill for the consumer.

The current invention not only provides a simple multiple function LED night light, but also provides excellent light performance. The LED night light with more than one function can add any function selected from, by way of example, an adaptor device, motion sensor device, PIR sensor device, air freshener, second light device, bug repellent device, sonic repellent device, surge protection device, emergency light device, time device, timer device, or any combination so the LED night light can be have nice light performance with more than single functions.

BRIEF DESCRIPTION OF THE DRAWINGS

FIGS. 1-4 are perspective views taken from different viewing angles showing a first preferred embodiment of a multiple function of LED night light.

FIG. 5 is a partially cut-away front view showing construction details of the preferred embodiment illustrated in FIGS. 1-4.

FIGS. 6-10 are perspective views at different viewing angles of a second preferred embodiment of a multiple function LED night light.

FIG. 11 is a perspective view of third preferred embodiment of a multiple function of LED light.

FIG. 12 is a perspective view of a fourth preferred embodiment of a multiple function LED light.

FIG. 13 is a perspective view of a fifth preferred embodiment of a multiple function of LED light with a base device for installation on an existing lamp socket,

DETAILED DESCRIPTION OF THE PREFERRED EMBODIMENTS

FIG. 1 shows a first preferred embodiment of a multiple functions LED night light in which the added function is adaptor device. The added function(s) may alternatively be selected from the devices described in FIG. 13 shown bug-repeller or-and $2^{nd}$. electric device or-and copending U.S. patent application Ser. Nos. 11/527,631; 11/527,629; 11/498,881; 11/498,874; and 11/527,628 etc., such as an (i) air freshener, (ii) adaptor device, (iii) sonic device, (iv) frequency device, (v) bug repeller device, (vi) second light device, (vii) timepiece, (viii) electric message device, (ix) timer device, (x) temperature device, (xi) surge protection device, (xii) electric short circuit protection device, (xiii) base device for installation on an existing lamp socket, (xiv) emergency light device, or (xv) any other electric device(s) suitable for home use to keep people comfortable or safe. The added function(s) may be one to N (any number) to make a very practical multiple functions LED night light.

As shown in FIG. 1, the multiple function LED night light (1) has a back housing (10) assembled with a front housing (20) and arranged to capture prong (30) (30') (31) within and enable delivery of electricity from the outlet AC power source through the adaptors (20) to the other electric appliance device (not shown). An optics-lens (40) exhibits light effects from the inner LED or LEDs to provide a light performance having predetermined functions, time, duration and so forth as required.

FIGS. 2, 3, 4 show the multiple function LED night light of FIG. 1 from different viewing angles. FIG. 5 shows details of the inner construction of one of preferred embodiment of variety of the multiple function LED night light (5) which has a back housing (100) and which holds an optic-lens or optics medium (400) having a ring design which is adjacent a circuit board (50) that connected to prong (300) (300') to deliver input home electricity to circuit-board (50) and the LEDs (60) (70) and cause the LEDs (60) (70) to emit a light beam into the optic-lens or optics medium (400) from the two input ends (60') and (70'). The preferred ring optics-lens or preferred optic-medium has input ends are "U" shaped so as to allow as many of the light beams emitted from the LEDs (60) (70) to enter the optic-lens or optics medium as possible. Some applications may have other designs for the optic-lens or optics medium and input ends, which is not a limitation for the current invention's preferred embodiment description. The input ends design can be any type which is still within the current invention scope. The prong (310) is a grounded type to provide more safety for the adaptor device. This prong arrangement can be varied depending on the different requirements of safety authorities or governments.

The optic-lens or optics medium and of FIG. 5 may have different arrangements that use sand-blasting to make the surface very rough and allow all the light to travel within without excess leakage, or use a plurality of the air-bubbles (or equivalent reflectors) inside the optic-lens or optics medium and to cause light beams from the LEDs to exit the optic-lens or optics medium big-surface not the ends and make whole piece or big-surface of optics-lens or-and optics medium with splendid bright spots showing along the length of the medium.

As shown in FIG. 5), the circuit (50) may incorporate desired electric components selected from the group including, alone or in combination, at least one resistor, capacitor, switch, sensor, diode, inductor, transformer, integrated circuit (hereafter as IC), or any available components suitable for electrically driving LED(s) to have predetermined functions, duration, time, effects, and/or brightness. The appropriate conductive-piece(s) used for the electric connection to the prong (300) (300') (310) and LEDs (60) (70). The conductive-piece(s) can be obtained from the marketplace and may include electric wires, and/or a wire-harness, cable, spring, metal piece, or other conductive-piece(s) without departing from the scope of the invention, as long as an electric signal can be delivered from the circuit (50) to the prong and LEDs.

FIGS. 6-10 show the same features as FIGS. 1-5, the only difference being the different housing design with different space to arrange the LEDs, prong, circuit, and added device(s) on the LED night light. Therefore, FIGS. 6-10 are not discussed in further detail herein except to note that the different housing design includes a second optical element (6), (7), (8), (9), or (10) in the form of a cover that lacks a rear wall to enable light beams exiting the at least one first optical element to be transmitted directly to and displayed on a wall having an electrical outlet into which the LED night light is plugged.

FIG. 11 shows a multiple function LED night light, in which the added function (801) can be selected from the group including any as above and below discussed (i) to (xv) 15 examples for $2^{nd}$-functions list but not limited for these 15 examples of $2^{nd}$ or more functions, or-and as disclosed in copending U.S. patent application Ser. Nos. 11/527,631; 11/527,629; 11/498,881; 11/498,874; and 11/527,628 etc., of an air freshener, adaptor device, sonic device, frequency device, bug repeller device, second light device, timepiece, electric message device, timer device, temperature device, surge protection device, electric short circuit protection device, base device for installation on an existing lamp socket, emergency light device, or any other electric device(s) suitable for home use to keep people comfortable or safe.

From FIG. 12 also shows a multiple function LED night light whose added functions can be selected from the above listed functions.

FIG. 13 shows a multiple function LED night light in which a special LED bulb (13) is included in the existing multiple function bulb night light housing with added function (13'). The multiple function LED night light of FIG. 13 has at least one LED device is installed on a geometric base that also has the added electric, mechanical, or chemical function. The LED light unit has base and has a bulb socket to accept the conventional bulb base, which may be selected from a screw type, pin type, rivet type, or knob type. The LED device has built-in circuit to change the original LED-light prong input-end AC electric signal to an LED's DC electric signal so as to turn on the LED(s) to exhibit predetermined function, duration, time, and/or brightness and light effects.

As shown in FIG. 13, the LED-light base (13') has a female bulb socket (80) and added adaptor function provided by the adaptor receptacles (3000) (3000') (3100), which offer electricity to other electric appliances while the prong (3200) (3200') are connected to the wall outlet. At the same time, while prong (3200) (3200') are connected with the wall outlet power source, the bulb socket (80) also will receive the wall outlet AC power source electric signal, which in the USA is around 110 Volt, 60 Hz, to turn on the said LED bulb. On the other hand, specially designed LED bulb device (13) has a built-in circuit to change the wall outlet power source of 110V AC, 60 Hz to the working voltage and frequency of the LED(s) with desired control components such as a photo sensor, PIR sensor, manual switch, or other control available in the marketplace to turn on LED(s) according to pre-determined functions, brightness, duration, and time.

The LED bulb (13) that fits into the bulb socket (80) has a lower bulb section (13A) for housing parts (86) including electric components (88) and at least one LED (85), and a base type (81) which may be but is not limited to a screw type base as shown in FIG. 13. The bulb base (81) has two electric terminals (83) and (82) to connect with electric signal electrodes (not shown) through an inner lamp holder (80) which is connected with a prong (3200) (3200'). The AC electric signal from the two electric terminals (83) and (82) is supplied to the circuit board (81'), which changes the AC electric signal from home appliance electric current to LED working DC current and turns on the LED (85) for single color or multiple colors to provide a desired light performance. The LED (85) is located on the side of the circuit board (81') and connected with circuitry (81') to connect with the bulb base electric terminals (82) (83) by conventional conductive-piece in circuit board (81'). The electric components (88) and LED (85), may be installed on the circuit board (81') or connected by conductive-piece (87) (84) away from the circuit board (81') because some components may be too big and unable to fit within the bulb base (81). The circuit board (81') is a narrow elongated board inserted into the bulb base (81), which is different with the prior art U.S. Pat. No. 6,227,679 (Zhang et al.) issued on May 8, 2001. The Zhang patent discloses a circuit board located on the top of the base, in a vertical relation to the circuit board and base. Also, in the arrangement of Zhang, the LEDs are not located on one side of the circuit board but rather are applied on the circuit board with a certain angle to the circuit board surface. This is because Zhang does not realize that the distance between the LED tip and the top cover is way too close and it is impossible to eliminate the spot-light problem of an LED light beam therefore cannot get a good light performance on the bulb surface. The current invention uses the invention described in one of the copending applications listed above, of an LED night light with more than one optics-lens, to make the spot-light beam into an area-light by first optics-lens. By adding a second optics-lens, the light beams brightness will be very close at every point on the desired area or surface.

As shown in FIG. 13, LED (85) on is situated on the edge of the circuit board (81') and positioned such that light beams from the LED are input to the first optics-lens (89) to cause the light beams to travel within the first optics-lens (89). The top may use a dome shape design or a "V" shape design to collect light beams that hit the top area of the first optics-lens. It will be appreciated that all equivalent treatments such as metallization of the top area or adding reflective arrangements within the first optics medium will be still fall within the scope of the invention. The LED device (13b) with screw type base can fit into a bulb night light's base socket (80) to replace the bulb and let the existing bulb night light become an LED night light without having to purchase a brand new unit to save money and change the big power consumption device into a lower power consumption device in seconds.

This arrangement solves the problem with the arrangement disclosed in the Zhang patent cited above that there is not enough space in a night light having the most popular dimensions to achieve a good area lighting effect. The most popular night light length is around 88 mm+/−50 mm (with base). The lens height is around 60 mm+/−30 mm (without base). The distance from the wall outlet cover to the highest point of the night light edge is around 35 mm+/−15 mm (from outlet cover surface). If placed in the same location as the existing bulb night light, the distance from the bulb socket to the wall outlet surface will be less than 35 mm. This distance from the wall to outside of the lens will only be less than 35 mm+/−15 mm. It is too short to change the spot-light effect of the LEDs into a surface or area lighting effect. The solution, as disclosed in the copending application is to use two optics to get a good surface or area lighted effect. This will be the best because LED night light power consumption falls within the 0.3 W+/−100% per LED range, whereas a bulb night light falls within a 4 Watt+/−50% per bulb range. As a result, the LED night light will have a big power saving and help reduce monthly electric bills for the consumer.

From above discussed and mentioned of preferred embodiments to show the scope of the current invention, it is appreciated that any alternative or equivalent functions of design still within the scope of the invention but not limited to all above discussion and mentioned details. The alternative or equivalent arrangement, process, installation or the like design, changes from the current invention still fall within the scope of the current invention.

The invention claimed is:

1. An LED night light, comprising:
at least one first optical lens positioned in front or on top of at least one LED to eliminate an LED spotlight effect, or transmit or change a light beam emitted by the at least one LED; and
at least one second optical lens that lacks a rear wall to enable light beams exiting from the at least one first optical lens to be transmitted to a wall having an electrical outlet into which the LED night light is plugged and to the second optical lens,
wherein the at least one second optical lens is a cover or outer lens assembled with a prong base, and
wherein the light beam is shown on the second optical lens in front of the night light, and an outlet wall surface.

2. An LED night light, comprising:
at least one first optical lens positioned in front or on top of at least one LED to eliminate an LED spotlight effect, or transmit or change a light beam emitted by the at least one LED; and
at least one added second optical lens or outer cover assembled to a prong base of the LED light, and
wherein a light beam exiting the first optical lens is directly emitted to at least two surfaces including a surface of
(1) the second optical lens or outer cover in front of the LED night light, and
(2) a wall having an outlet into which the LED night light is plugged.

3. An LED night light, comprising:
at least one first optics lens positioned in front, on top, or on a side of at least one multiple color LED, the at least one first optics lens transmitting or changing a light beam emitted by the at least one LED to create an area illumination having substantially even brightness,
wherein the area illumination is shown on
(i) a second optics lens in front of the LED night light, the second optics lens being a separate unit without a rear wall and assembled with a prong unit, and
(ii) a wall having an outlet into which the LED night light is plugged,
wherein LED night light includes an integrated circuit to provide predetermined LED light functions, effects, or performance.

4. An LED night light, comprising:
at least one first optical lens positioned in front, on top, or on a side of at least one LED; and
at least one second optical lens, the second optical lens being a unit assembled to a prong unit,
wherein the at least one second optical lens is a cover or outer lens without a rear wall, and
wherein a light beam exiting the first optical lens is emitted to at least two surfaces including a surface of
(1) the second optical lens, and
(2) a wall having an outlet into which the LED night light is plugged.

5. An LED night light, comprising:

more than one optical lens to change a narrow angle LED light beam into an LED light beam having a wider area, a changed viewing angle, or a reduced LED spotlight effect, wherein the wider area, changed viewing angle, or reduced LED spotlight effect is created by emission of the narrow angle light beam through a first optical lens and then emission to (1) a surface of a second optical lens, and (2) a surface of a wall having an outlet into which at least one prong of the LED night light is plugged, and wherein the second optical lens is a unit assembled to a prong base and is an outer or cover lens that lacks a rear wall.

6. An LED night light, comprising:

(a) at least one first optical lens, (b) at least one second optical lens on a front of the night light and lacking a rear wall, the first optical lens and the second optical lens configured to change a narrow light beam from an LED into a light beam that (i) does not form a bright light spot, or
(ii) has a substantially even brightness, the light beam exiting from the first optical lens being shown on (A) the second optical lens, and
(B) a wall having an outlet into which at least one prong of the LED night light is plugged, wherein the LED night light includes at least one of the following additional function devices:

(1) at least one adaptor or outlet;
(2) at least one sonic or bug repeller device;
(3) at least one second color LED with at least one selection switch;
(4) a timer;
(5) a surge protection, electrical short protection, or overheat protection device;
(6) an emergency or power fail device;
(7) a motion sensor;
(8) a temperature device;
(9) an integrated circuit for setting, adjusting, selecting, or changing at least one LED light function, timing or duration.

7. An LED night light, comprising:

more than one optical lens, one of which is an outer lens that lacks a rear wall, to change a narrow angle LED light beam into an LED light beam that (i) lacks bright light spots, or (ii) has a substantially even brightness; and an integrated circuit for causing at least one LED to exhibit area illumination having a predetermined timing, duration, function, or effects, and that is shown in front of the LED night light on the outer lens, wherein the illumination is controlled by at least one of a switch or photo sensor.

8. An LED night light, comprising:

at least one of (a) a first optical lens, and (b) a second optical lens that lacks a rear wall and that is assembled with a prong base, to change a narrow angle LED light beam into an LED light beam that (i) lacks bright light spots, or (ii) has a substantially even brightness area or wider viewing angle, wherein the LED light beam is shown in front of the LED night light on (1) an outer cover or (2) the second optical lens, wherein the LED night light is controlled by at least one of: (a) at least one switch, and (b) a photo sensor; and wherein the LED night has at least one built-in AC outlet with or without a built-in surge, short-circuit, or overheat protection function.

* * * * *